US008842311B2

(12) United States Patent
Takasu et al.

(10) Patent No.: US 8,842,311 B2
(45) Date of Patent: Sep. 23, 2014

(54) ELECTRONIC APPARATUS, IMAGE FORMING APPARATUS, AND SECURITY LEVEL MANAGEMENT METHOD

(71) Applicant: KYOCERA Document Solutions Inc., Osaka (JP)

(72) Inventors: Koto Takasu, Osaka (JP); Masaru Sato, Osaka (JP); Shigeki Kimura, Osaka (JP); Masaki Sone, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 13/850,223

(22) Filed: Mar. 25, 2013

(65) Prior Publication Data

US 2013/0258393 A1 Oct. 3, 2013

(30) Foreign Application Priority Data

Mar. 28, 2012 (JP) .................................. 2012-74569

(51) Int. Cl.

*G06K 15/00* (2006.01)
*G06F 3/12* (2006.01)
*H04N 1/40* (2006.01)
*H04N 1/00* (2006.01)
*H04L 29/06* (2006.01)
*H04N 1/44* (2006.01)
*G06F 21/00* (2013.01)
*G06F 21/60* (2013.01)

(52) U.S. Cl.

CPC ....... *H04N 1/00838* (2013.01); *H04N 1/00068* (2013.01); *G06F 3/1222* (2013.01); *H04L 63/20* (2013.01); *H04N 1/44* (2013.01); *G06F 21/00* (2013.01); *G06F 21/608* (2013.01); *H04N 2201/0094* (2013.01)

USPC ........ 358/1.14; 358/1.15; 358/1.16; 358/3.28

(58) Field of Classification Search

USPC .............. 358/1.14, 1.15, 1.16, 3.28; 709/224, 709/225, 250, 227, 201; 726/1, 7, 23, 6, 14, 726/21, 26, 33, 34

See application file for complete search history.

(56) References Cited

U.S. PATENT DOCUMENTS

2010/0186063 A1 * 7/2010 Oba et al. ......................... 726/1

FOREIGN PATENT DOCUMENTS

JP 2004-227496 A 8/2004

OTHER PUBLICATIONS

Fujii Shuji et al.,Image Processor,Dec. 8, 2004,Machine Translator Japanese Patent Application Publication, JP2004227496, All pages.*

Will Urbanski, Security Recommendations for Multifunction Printers, Sep. 2010,Virginia Tech, Virginia Tech IT Security Office and Lab, All Pages.*

Samsung, Samsung Multifunction Printer Security, Mar. 28, 2011, Samsung Electronics, Samsung MFP Security White Paper, All pages.*

* cited by examiner

*Primary Examiner* — Ngon Nguyen

(74) *Attorney, Agent, or Firm* — Knobbe, Martens Olson & Bear LLP

(57) ABSTRACT

An electronic apparatus includes a security storage unit, a security information acquisition unit, a calculation unit, a determination unit, a notification unit, and an operation control unit. The security storage unit is configured to store a plurality of securities together with respective security levels associated with the securities. The security information acquisition unit is configured to acquire security information concerning the apparatus. The calculation unit is configured to calculate a total of the security level or levels of the security or securities applied to the apparatus, using the security levels of the securities stored in the security storage unit. The determination unit is configured to determine whether or not the calculated total has reached a predetermined threshold.

10 Claims, 9 Drawing Sheets

1
DOCUMENT FEED UNIT 6
IMAGE READING UNIT 5
IMAGE FORMING MECHANISM 40
IMAGE MEMORY 32
HDD 92
CONTROL UNIT 10
SECURITY STORAGE UNIT 101
SECURITY INFORMATION ACQUISITION UNIT 102
CALCULATION UNIT 103
DETERMINATION UNIT 104
OPERATION CONTROL UNIT 105
DECISION UNIT 106
CREATION UNIT 107
OPERATION UNIT 47
DISPLAY UNIT 473
FACSIMILE COMMUNICATION UNIT 71
NETWORK INTERFACE UNIT 91
IMAGE PROCESSING UNIT 31

1
OPERATION UNIT
DISPLAY UNIT
47
473
FACSIMILE COMMUNICATION UNIT
71
NETWORK INTERFACE UNIT
91
IMAGE PROCESSING UNIT
31
CONTROL UNIT
10
SECURITY STORAGE UNIT
101
SECURITY INFORMATION ACQUISITION UNIT
102
CALCULATION UNIT
103
DETERMINATION UNIT
104
OPERATION CONTROL UNIT
105
DECISION UNIT
106
CREATION UNIT
107
DOCUMENT FEED UNIT
6
IMAGE READING UNIT
5
IMAGE FORMING MECHANISM
40
IMAGE MEMORY
32
HDD
92

FIG.4

| SECURITY STANDARD \ STATE | A | B | C | D | E | F |
|---|---|---|---|---|---|---|
| INTERNATIONAL SECURITY STANDARD (10) | 10 | 10 | 10 | | | |
| FIPS140-2 (5) | 5 | 5 | | 5 | 5 | |
| HIPAA (3) | 3 | | | 3 | | 3 |
| TOTAL | 18 | 15 | 10 | 8 | 5 | 3 |

FIG.5

| SECURITY FEATURE \ STATE | A | B | C | D |
|---|---|---|---|---|
| ENCRYPTION (6) | 6 | 6 | 6 | 6 |
| RESTRICTION ON AVAILABLE TIME (5) | 5 | 5 | 5 | 5 |
| OVER WRITE/ERASURE AFTER USE (4) | | 4 | 4 | 4 |
| FINGERPRINT AUTHENTICATION (3) | | | 3 | 3 |
| ENTRY OF ALPHANUMERIC PASSWORD (2) | | | | 2 |
| AUDIT LOG (1) | | | | 1 |
| TOTAL | 11 | 15 | 18 | 21 |

FIG. 7

| SECURITY ENVIRONMENT \ STATE | A | B | C | D | E |
|---|---|---|---|---|---|
| DEFENSEAGAINST ATTACKS FROM UNAUTHORIZED USERS | 16 | 6 | 10 | 16 | 6 |
| DEFENSEAGAINST ATTACKS FROM ATT ACKERS OUTSIDE USER ENVIRONMENT | 20 | 10 | 10 | 16 | 6 |
| DEFENSEAGAINST ATTACKS FROM ATTACKERS IN USER ENVIRONMENT | 13 | 6 | 6 | 6 | 6 |
| DEFENSEAGAINST ABUSE OF AUTHORITY | 16 | 6 | 6 | 6 | 6 |
| INDIRECT RESPONSE TO ATTACKS | 1 | 0 | 1 | 0 | 1 |
| GRANDTOTAL | 66 | 28 | 33 | 44 | 25 |

ELECTRONIC APPARATUS, IMAGE FORMING APPARATUS, AND SECURITY LEVEL MANAGEMENT METHOD

INCORPORATION BY REFERENCE

This application claims priority to Japanese Patent Application No. 2012-74569 filed on Mar. 28, 2012, the entire contents of which are incorporated by reference herein.

BACKGROUND

The present disclosure relates to an electronic apparatus, an image forming apparatus, and a security level management method and particularly relates to a technique of managing the level of security applied to an electronic apparatus, such as an image forming apparatus.

Electronic apparatuses, such as image forming apparatuses and image processing apparatuses, have various securities applied thereto in order to prevent leakage and other complications of data being handled therein. There are also proposed techniques for maintaining the level of the security applied to the electronic apparatus at a certain level. An example of the proposed techniques is as follows: The level of security set to the apparatus is checked and a security level determining means determines whether or not the security level has been changed from the default. If the security level determining means determines that the security level has been changed from the default, the manager is notified of a message indicating that the security level has been changed via a network.

SUMMARY

An electronic apparatus and an image forming apparatus according to one aspect of the present disclosure include a security storage unit, a security information acquisition unit, a calculation unit, and a determination unit.

The security storage unit is configured to store a plurality of predetermined securities together with respective security levels associated with the securities.

The security information acquisition unit is configured to acquire security information indicating the security or securities applied to the apparatus.

The calculation unit is configured to calculate a total of the security level or levels of the security or securities indicated by the security information acquired by the security information acquisition unit, using the security levels stored in the security storage unit.

The determination unit is configured to determine whether or not the total calculated by the calculation unit has reached a predetermined threshold.

Furthermore, a security level management method according to one aspect of the present disclosure includes a security storage step, a security information acquisition step, a calculation step, and a determination step.

The security storage step is the step of storing a plurality of predetermined securities together with respective security levels associated with the securities.

The security information acquisition step is the step of acquiring security information indicating the security or securities applied to the electronic apparatus.

The calculation step is the step of calculating a total of the security level or levels of the security or securities indicated by the security information acquired in the security information acquisition step, using the security levels stored in the security storage step.

The determination step is the step of determining whether or not the total calculated in the calculation step has reached a predetermined threshold.

BRIEF DESCRIPTION OF THE DRAWINGS

FIG. 4 is a table showing exemplary totals calculated based on security standards applied to the image forming apparatus.

FIG. 5 is a table showing exemplary totals calculated based on security features applied to the image forming apparatus.

FIG. 7 is a table showing exemplary grand totals calculated based on security environments applied to the image forming apparatus.

DETAILED DESCRIPTION

With reference to the drawings, a description will hereinafter be given of an electronic apparatus, an image forming apparatus, a security level management program, and a computer-readable non-transitory storage medium with a security level management program stored thereon according to an embodiment corresponding to one aspect of the present disclosure.

Figure 1:
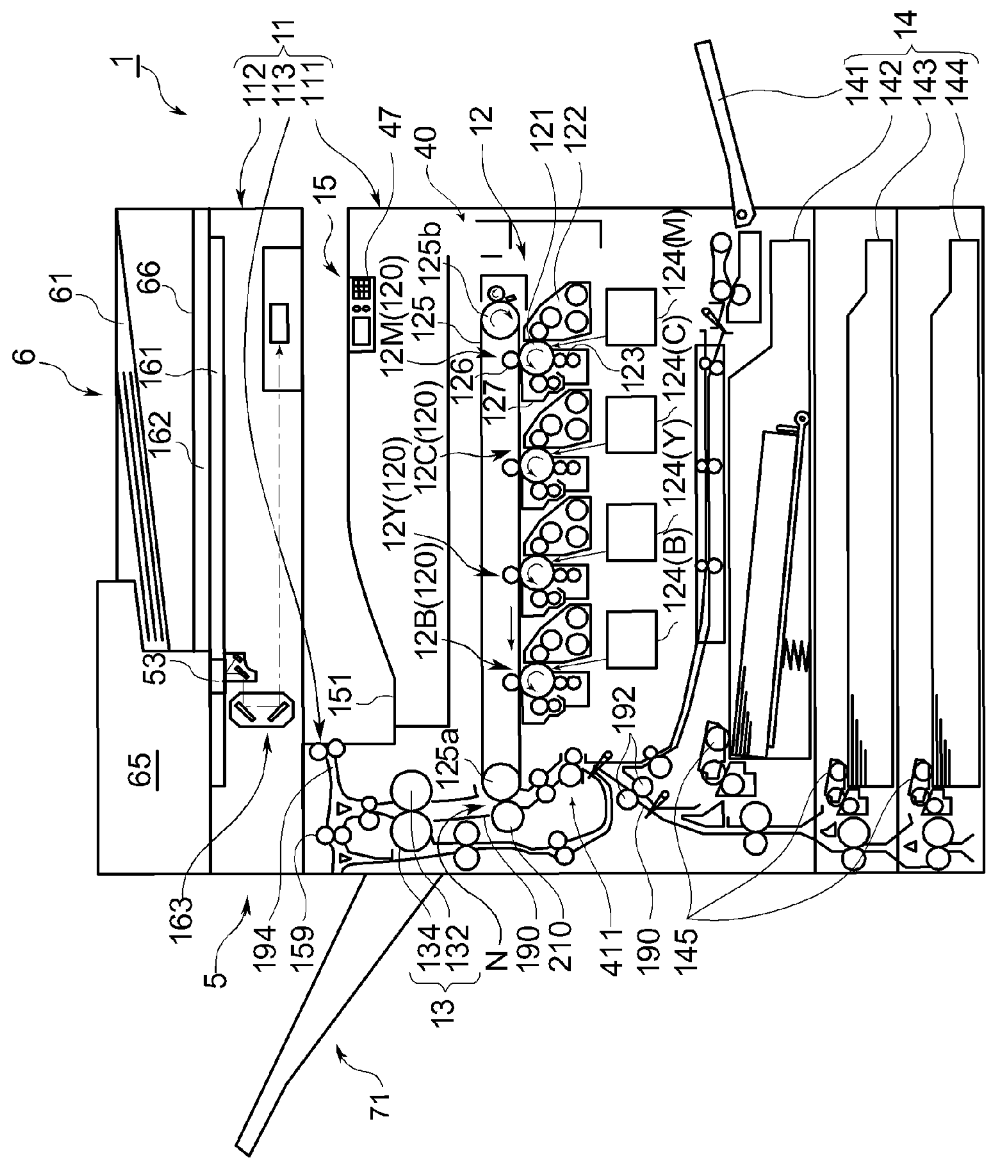
FIG. 1 is a front cross-sectional view showing the structure of an image forming apparatus according to an embodiment corresponding to one aspect of the present disclosure.

FIG. 1 is a front cross-sectional view showing the structure of an image forming apparatus according to an embodiment corresponding to one aspect of the present disclosure.

An image forming apparatus 1 as an electronic apparatus according to an embodiment corresponding to one aspect of the present disclosure is a multifunction peripheral having multiple functions including, for example, a copy function, a print function, a scan function, and a facsimile function. The image forming apparatus 1 is made up so that an apparatus body 11 includes an image forming unit 12, a fixing unit 13, a paper feed unit 14, a document feed unit 6, and an image reading unit 5.

The apparatus body 11 includes a lower body 111, an upper body 112 opposed to and above the lower body 111, and a connecting portion 113 provided between the upper body 112 and the lower body 111. The upper body 112 is provided with the image reading unit 5 and the document feed unit 6.

The image reading unit 5 includes an original glass plate 161 which is fitted to the top of an opening in the upper body 112 and on which an original document is to be placed; an openable/closable original cover 162 for holding the original document placed on the original glass plate 161; and a reader 163 for reading an image of the original document placed on the original glass plate 161. The reader 163 includes a lighting part (light source) as a light source having an LED (light emitting diode) for irradiating the original document with light; an image sensor (conversion part), such as a CCD (charge coupled device) or a CMOS (complementary metal oxide semiconductor); and an optical system which includes a plurality of mirrors and a condenser lens and is movable between a position below a document read slit 53 and an original read position below the original glass plate 161 as a document position. Using these components, the reader 163 optically reads an image of the original document and creates image data. The created image data is used to form an image in the image forming unit 12 or store it on an HDD 92 to be described later.

The document feed unit 6 feeds original documents placed on a document placement portion 61 sheet by sheet by the driving of a paper feed roller, conveys the document to a position facing the document read slit 53 by the driving of a conveyance roller to make it possible for the reader 163 of the image reading unit 5 to read the document through the document read slit 53, and then ejects it to a document ejection portion 66. In the case of this setting in which a document conveyed by the document feed unit 6 is read, the reader 163 reads, in a fed document read position below the document read slit 53, the document conveyed by the document feed unit 6.

The lower body 111 is internally provided with the image forming unit 12, the fixing unit 13, and the paper feed unit 14. The paper feed unit 14 includes paper feed cassettes 142, 143, 144 insertable into and removable from the apparatus body 11.

The image forming unit 12 performs an image forming operation of forming a toner image on recording paper fed from the paper feed unit 14. The image forming unit 12 includes a magenta image forming unit 12M, a cyan image forming unit 12C, an yellow image forming unit 12Y, and a black image forming unit 12Bk which are sequentially arranged from upstream to downstream in the running direction of an intermediate transfer belt 125 (hereinafter, each image forming unit is also called an "image forming unit 120" when referred to without distinction). The magenta image forming unit 12M uses magenta toner. The cyan image forming unit 12C uses cyan toner. The yellow image forming unit 12Y uses yellow toner. The black image forming unit 12B uses black toner. The image forming unit 12 also includes the intermediate transfer belt 125 mounted between a plurality of rollers including a drive roller (roller opposed to a secondary transfer roller described below) 125*a* to be able to endlessly run in a direction of sub scanning for image formation; and a secondary transfer roller 210 which engages against a portion of the intermediate transfer belt 125 wound around the drive roller 125*a* on the outer peripheral side of the intermediate transfer belt 125.

Each image forming unit 120 includes, in combination, a photosensitive drum 121, a developing device 122 operable to supply toner to the photosensitive drum 121, a toner cartridge (not shown) for holding toner, a charging device 123, an exposure device 124, a primary transfer roller 126, and a drum cleaning device 127.

The photosensitive drum 121 forms on the peripheral surface an electrostatic latent image and a toner image based on the latent image. The developing device 122 supplies toner to the photosensitive drum 121. Each developing device 122 is appropriately supplied with toner from the toner cartridge.

The charging device 123 is provided just below the photosensitive drum 121. The charging device 123 electrostatically and uniformly charges the peripheral surface of the associated photosensitive drum 121.

The exposure device 124 is provided below the photosensitive drum 121 and further below the charging device 123. The exposure device 124 irradiates the peripheral surface of the charged photosensitive drum 121 with laser light corresponding to each color based on image data input from a computer or the like or imaged data acquired by the image reading unit 5 to form an electrostatic latent image on the surface of the associated photosensitive drum 121. The exposure device 124 is a so-called laser exposure device and includes a laser light source for outputting laser beam, a polygon mirror for reflecting the laser beam to the surface of the photosensitive drum 121, and optical components, including a lens and a mirror, configured to bring the laser light reflected by the polygon mirror to the photosensitive drum 121.

The developing device 122 supplies toner to the electrostatic latent image on the peripheral surface of the photosensitive drum 121 rotating in the direction of the arrow to lay the toner thereon, thereby forming a toner image corresponding to the image data on the peripheral surface of the photosensitive drum 121.

The intermediate transfer belt 125 is disposed above the photosensitive drums 121. The intermediate transfer belt 125 is mounted in an endlessly movable manner between the drive roller 125*a* located to the left in FIG. 1 and a driven roller 125*b* located to the right in FIG. 1 and the lower portion of the outer peripheral surface engages against each of the peripheral surfaces of the photosensitive drums 121. The driven roller 125*b* is provided opposite to the drive roller 125*a* and rotates to follow the endless run of the intermediate transfer belt 125. The outer peripheral surface of the intermediate transfer belt 125 is set to an image carrying surface to which a toner image is to be transferred. The intermediate transfer belt 125 is driven by the drive roller 125*a* while engaging against the peripheral surfaces of the photosensitive drums 121. The intermediate transfer belt 125 endlessly runs between the drive roller 125*a* and the driven roller 125*b* while synchronizing with each photosensitive drum 121.

Each primary transfer roller 126 is provided at a position opposed to the associated photosensitive drum 121 with the intermediate transfer belt 125 interposed therebetween. A transfer bias is applied to the primary transfer roller 126 by an unshown transfer bias application mechanism. Thus, the primary transfer roller 126 transfers the toner image formed on the outer peripheral surface of the associated photosensitive drum 121 to the surface of the intermediate transfer belt 125.

A control unit 10 (FIG. 2) controls the driving of the primary transfer roller 126 and the image forming unit 120 on a color-by-color basis to perform the transfer of a magenta toner image formed by the magenta image forming unit 12M to the surface of the intermediate transfer belt 125, then the transfer of a cyan toner image formed by the cyan image forming unit 12C to the same position of the intermediate transfer belt 125, then the transfer of an yellow toner image formed by the yellow image forming unit 12Y to the same position of the intermediate transfer belt 125, and finally the transfer of a black toner image formed by the black image forming unit 12B to superimpose these different colored toner images on each other. Thus, a multicolor toner image is formed on the surface of the intermediate transfer belt 125 (intermediate transfer or primary transfer).

A transfer bias is also applied to the secondary transfer roller 210 by an unshown transfer bias application mechanism. The secondary transfer roller 210 transfers the multicolor toner image formed on the surface of the intermediate transfer belt 125 to recording paper conveyed from the paper feed unit 14. The secondary transfer roller 210 forms a nip portion N with the drive roller 125*a* with the intermediate transfer belt 125 interposed therebetween. At the nip portion N, the toner image is secondarily transferred to the recording paper. The recording paper conveyed along a paper conveyance path 190 is pressed and clamped at the nip position N between the intermediate transfer belt 125 and the secondary transfer roller 210 and, thus, the toner image on the intermediate transfer belt 125 is secondarily transferred to the recording paper at the nip position.

Each drum cleaning device 127 is provided to the left of the associated photosensitive drum 121 in FIG. 1 and cleans residual toner from the peripheral surface of the photosensitive drum 121.

To the left of the image forming unit 12 in FIG. 1, a vertically extending paper conveyance path 190 is formed. The paper conveyance path 190 includes pairs of conveyance rollers 192 at appropriate positions. The pairs of conveyance rollers 192 convey recording paper fed out of the paper feed unit 14 toward the nip position N and the fixing unit 13. In other words, the recording paper is conveyed by a conveyance mechanism composed of the pairs of conveyance rollers 192 arranged at appropriate positions.

The fixing unit 13 includes: a heat roller 132 internally provided with a current-carrying heating element as a heating source; and a pressure roller 134 opposed to the heat roller 132. The fixing unit 13 performs a fixing treatment by applying heat from the heat roller 132 to the toner image on the recording paper transferred in the image forming unit 12 while the recording paper is passing through a fixing nip position between the heat roller 132 and the pressure roller 134. The recording paper on which a color image is formed by the completion of the fixing treatment passes through a paper output path 194 extended from the top of the fixing unit 13 and is ejected to a paper output tray 151 provided on the top of the lower body 111.

The paper feed unit 14 includes: a manual feed tray 141 openably and closably provided at a right side wall of the apparatus body 11 in FIG. 1; and the paper feed cassettes 142, 143, 144. Pick-up rollers 145 provided above the paper feed cassettes 142, 143, 144 can feed respective uppermost recording paper sheets of the paper sheet stacks contained in the paper feed cassettes 142, 143, 144 to the paper conveyance path 190.

A paper output unit 15 is formed between the lower body 111 and the upper body 112. The paper output unit 15 includes the paper output tray 151 formed on the top surface of the lower body 111. The paper output tray 151 is a tray to which the recording paper having a toner image formed thereon in the image forming unit 12 is ejected after being subjected to a fixing treatment in the fixing unit 13.

Figure 2:
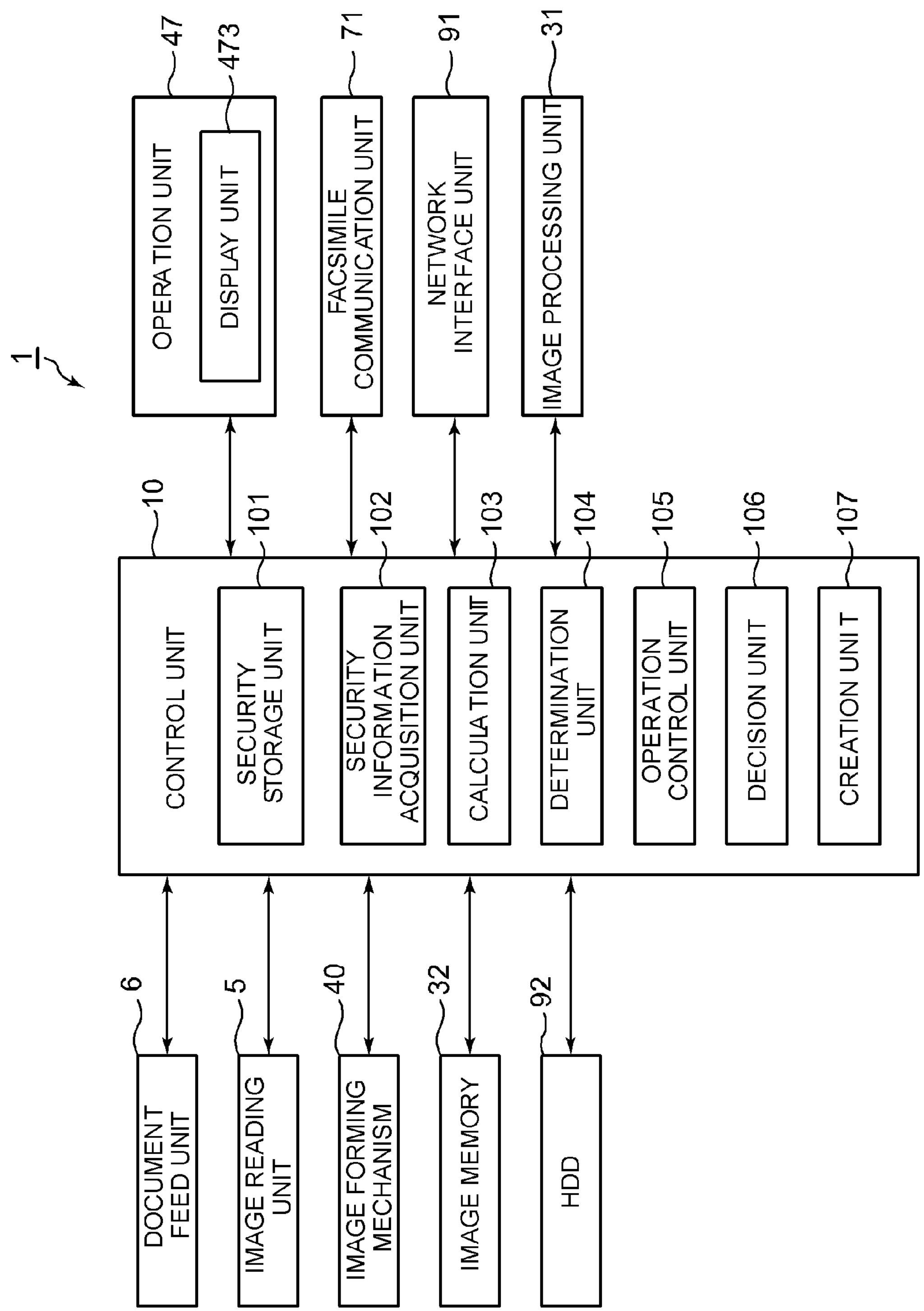
FIG. 2 is a functional block diagram schematically showing an essential internal structure of the image forming apparatus.

The structure of the image forming apparatus 1 will next be described. FIG. 2 is a functional block diagram schematically showing an essential internal structure of the image forming apparatus 1.

The image forming apparatus 1 includes the control unit 10. The control unit 10 is composed of a CPU (central processing unit), a RAM (random access memory), a ROM (reed only memory), a dedicated hardware circuit and so on and governs the overall operation control of the image forming apparatus 1.

The control unit 10 is connected to the image reading unit 5, the document feed unit 6, an image processing unit 31, an image memory 32, an image forming mechanism 40, an operation unit 47, a facsimile communication unit 71, a network interface unit 91, an HDD (hard disk drive) 92 and so on. The control unit 10 performs the operation control of the above mechanisms connected thereto and signal or data transfer to and from the mechanisms.

The control unit 10 controls the driving and processing of the above mechanisms necessary to perform the operation control of each of the scan function, the print function, the copy function, and the facsimile function in accordance with a command to execute a job entered by an operator via the operation unit 47, and a network-connected personal computer or the like.

The image reading unit 5 is under the control of the control unit 10 and includes the reader 163 including the lighting part, the CCD sensor and so on. The image reading unit 5 reads an image from an original document by irradiating the document with light from the lighting part and receiving the reflected light on the CCD sensor.

The image processing unit 31, if necessary, processes image data of the image read by the image reading unit 5. For example, in order that the image read by the image reading unit 5 is improved in quality after the formation of an image in the image forming unit 12, the image processing unit 31 performs a predetermined image processing, such as shading correction.

The image memory 32 provides a region for temporarily storing data of image of the document read by the image reading unit 5 and temporarily storing data to be printed by the image forming unit 12.

The image forming mechanism 40 also shown in FIG. 1 includes the above image forming unit 12, the above fixing unit 13, and the paper conveyance mechanism 411 composed of the pairs of conveyance rollers 192 and so on. The image forming mechanism 40 forms an image of image data or the like read by the image reading unit 5.

The operation unit 47 also shown in FIG. 1 includes a touch panel unit and an operation key unit which accept operator's commands for various operations and processings executable by the image forming apparatus 1. The touch panel unit includes a display unit (notification unit) 473 formed such as of an LCD (liquid crystal display) with a touch panel.

The facsimile communication unit 71 includes a coding/decoding unit, a modulation/demodulation unit, and an NCU (network control unit), all of which are not illustrated, and performs facsimile communication using a public telephone network.

The network interface unit 91 is constituted by a communication module, such as a LAN board, and transfers various data to and from devices (such as personal computers) in a local area via a LAN or the like connected to the network interface unit 91.

The HDD 92 is a large storage device capable of storing document images and the like read by the image reading unit 5.

Stored (installed) in the HDD 92 as a storage medium is a security level management program according to an embodiment corresponding to one aspect of the present disclosure. The control unit 10 operates in accordance with the security level management program and thus serves as a security storage unit 101, a security information acquisition unit 102, a calculation unit 103, a determination unit 104, an operation control unit 105, a decision unit 106, and a creation unit 107 which are to be described later.

The security level management program is distributed in recorded form on a storage medium, such as a USB memory, a CD or a DVD, read by a driver of the image forming apparatus 1, and then stored on the HDD 92, an unshown memory or the like. Alternatively, the security level management program is downloaded by the image forming apparatus 1 from a server network-connected to the image forming apparatus 1 and thus stored on the HDD 92, the unshown memory or the like.

Each of the security storage unit 101, the security information acquisition unit 102, the calculation unit 103, the determination unit 104, the operation control unit 105, the decision unit 106, and the creation unit 107 may be constituted not by an operation of the control unit 10 based on the security level management program but by a hardware circuit. Hereinafter, the same applies to the following embodiments unless otherwise specified. To the extent necessary in embodiments to be described later, the decision unit 106 and the creation unit 107 form components of the image forming apparatus 1 according to each of the embodiments corresponding to aspects of the present disclosure.

The security storage unit 101 stores a plurality of predetermined securities. The security refers to, for example, a security standard, a security feature, or a security environment. The security storage unit 101, however, may not necessarily store all of a set of security standards, a set of security features, and a set of security environments and need only to store at least one of the sets.

For example, the security standard refers to an agreement defining requirements for securing a certain degree of safety, such as International Security Standard, FIPS 140-2, or HIPAA. No particular limitation is placed on the types and numbers of security standards stored in the security storage unit 101. In this embodiment, the security storage unit 101 stores the above three types of security standards, i.e., International Security Standard, FIPS 140-2, and HIPAA.

HIPAA is a set of rules for medical institutions to maintain the confidentiality, integrity, and availability of important information about patients. Ensuring of security for maintaining information confidentiality required by HIPAA is directed to medical-care providers, medical insurers, and medical information centers. HIPAA used as the security standard herein refers to the security for HIPAA.

The security feature refers to a security program that performs a predetermined processing. Examples of the security feature include encryption, restriction on available time, biometrics, entry of alphanumeric password, and audit log. The description of biometrics is herein given using fingerprint authentication as an example. No particular limitation is placed on the types and numbers of security features stored in the security storage unit 101. In this embodiment, the security storage unit 101 stores five types of security features, i.e., encryption, restriction on available time, fingerprint authentication, entry of alphanumeric password, and audit log. Examples of the password policy to be used for entry of alphanumeric password include case sensitivity and use of any special symbol.

The security environment refers to a predefined defense against attacks from unauthorized users. Examples of the security environment includes a defense against attacks from unauthorized users, a defense against attacks from attackers outside the user environment, a defense against attacks from attackers in the user environment, a defense against abuse, and indirect response to attacks. No particular limitation is placed on the types and numbers of security environments stored in the security storage unit 101. In this embodiment, the security storage unit 101 stores five types of security environments, i.e., a defense against attacks from unauthorized users, a defense against attacks from attackers outside the user environment, a defense against attacks from attackers in the user environment, a defense against abuse, and indirect response to attacks.

The security storage unit 101 also stores respective security levels associated with the above securities. A security level is previously set to each security and numerically represents the degree of safety of the security. In this embodiment, the greater the value of security level, the higher the safety. The security levels stored in the security storage unit 101 are set to every security standard if the securities are security standards, to every security feature if the securities are security features, and to every security environment if the securities are security environments.

The security information acquisition unit 102 acquires security information indicating the security or securities applied to the image forming apparatus 1 and data handled thereby. For example, when the name of the security (such as a security standard and/or a security feature) applied to the image forming apparatus 1 is entered by an operator operating the operation unit 47, the security information acquisition unit 102 acquires the name as a security information element. Alternatively, an operator or a manufacturer may previously store, in a memory or the like built in the image forming apparatus 1, security information indicating the security or securities applied to the image forming apparatus 1 and the security information acquisition unit 102 may acquire the security information from the memory or the like.

The calculation unit 103 reads from the security storage unit 101 the respective security levels of the securities indicated by the security information elements acquired by the security information acquisition unit 102 and calculates the total of the read security levels. The total is used as an index indicating the overall safety provided by all of the securities applied to the image forming apparatus 1.

The determination unit 104 determines whether or not the total calculated by the calculation unit 103 has reached a predetermined threshold. The predetermined threshold is a numerically value that represents an index indicating the overall security level (overall safety) which the image forming apparatus 1 is required to secure. Namely, the determination unit 104 determines whether or not the total has reached the predetermined threshold and consequently determines whether or not the overall security level required for the image forming apparatus 1 is satisfied by all the securities applied to the image forming apparatus 1.

The operation control unit 105 causes the display unit 473 to notify of the determination result of the determination unit 104.

If the determination unit 104 determines that the total has reached the threshold and determines that the security or securities indicated by the security information include a predetermined essential security or securities, the decision unit 106 decides that the overall security level secured by the image forming apparatus 1 has reached a reference level. On the other hand, if the determination unit 104 determines that the total has not reached the threshold and/or determines that the security or securities indicated by the security information do not include the predetermined essential security or securities, the decision unit 106 decides that the overall security level secured by the image forming apparatus 1 has not reached the reference level.

If the determination unit 104 determines that the total has not reached the threshold, the creation unit 107 creates a combination of securities which makes the total reach the threshold, using some or all of the security standards stored in the security storage unit 101.

Figure 3:
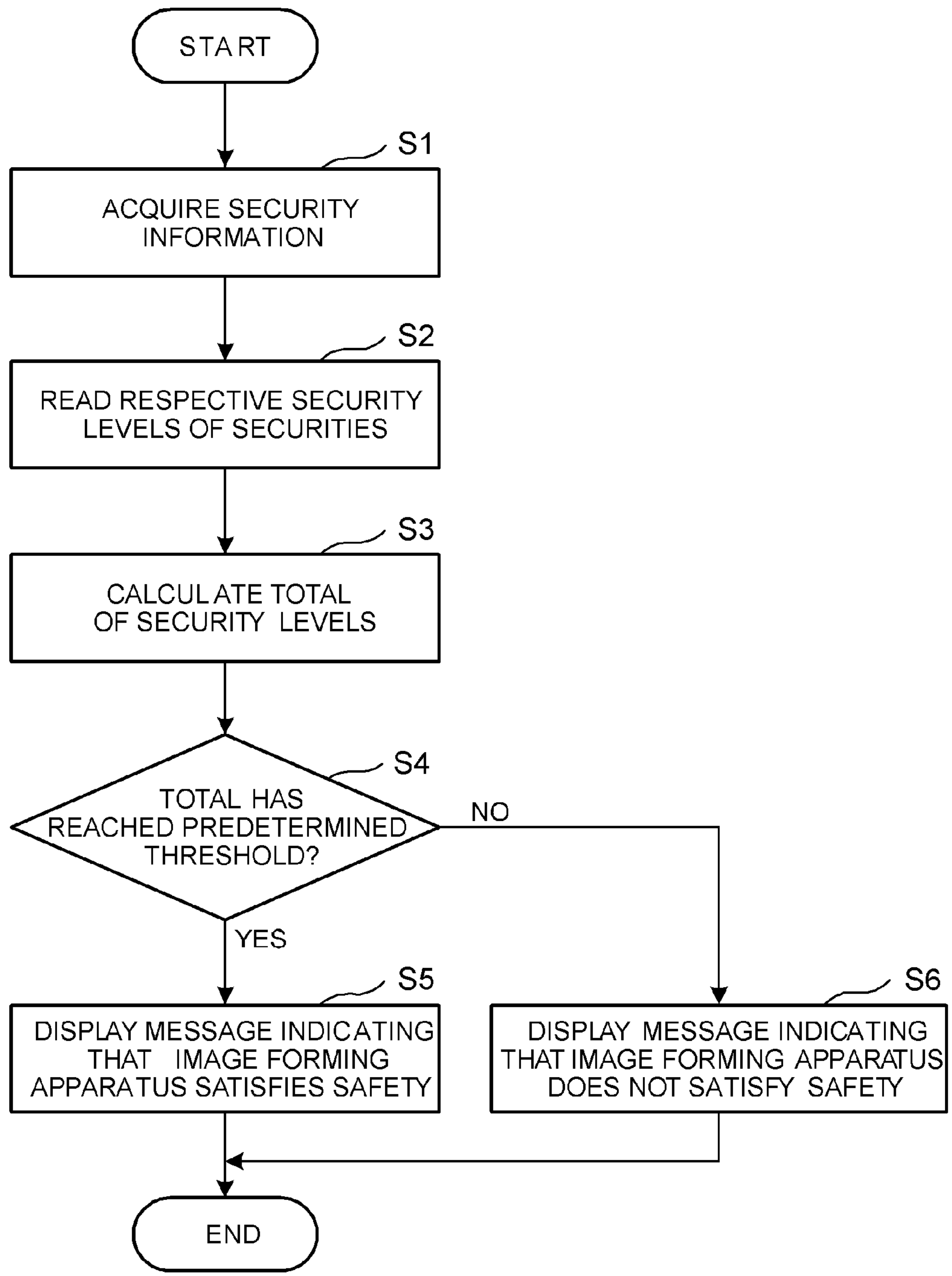
FIG. 3 is a flowchart showing first and second embodiments of a security level management.

A description will next be given of a first embodiment of a security level management in the image forming apparatus 1. FIG. 3 is a flowchart showing the first embodiment of the security level management. FIG. 4 is a table showing exemplary totals calculated based on security standards applied to the image forming apparatus 1.

The case where the above securities are security standards is described as the first embodiment.

When the processing of the security level management starts, the security information acquisition unit 102 acquires security information elements entered by an operator operating the operation unit 47 and applied to the image forming apparatus 1 or security information elements stored in the memory (S1).

The calculation unit 103 reads from the security storage unit 101 the respective security levels of the security standards indicated by the security information elements acquired by the security information acquisition unit 102 (S2) and calculates the total of the read security levels of the security standards (S3).

The determination unit 104 determines whether or not the total calculated by the calculation unit 103 has reached a predetermined threshold (S4).

To illustrate the above, an example will be presented in which there are ten security levels from 1 to 10, International Security Standard is set at a security level of 10, FIPS 140-2 is set at a security level of 5, HIPAA is set at a security level of 3, and the predetermined threshold is 8.

In this example, if, referring to FIG. 4, the image forming apparatus 1 is in State A meeting the requirements of International Security Standard, FIPS 140-2, and HIPAA, in State B meeting the requirements of International Security Standard and FIPS 140-2, in State C meeting only the requirement of International Security Standard or in State D meeting the requirements of FIPS 140-2 and HIPAA, the calculation unit 103 calculates a total of 18(State A), 15(State B), 10(State C) or 8(State D), respectively. Thus, the determination unit 104 determines, in any of States A to D, that the total has reached the threshold.

On the other hand, if the image forming apparatus 1 is in State E meeting only the requirement of FIPS 140-2 or in State F meeting only the requirement of HIPAA, the calculation unit 103 calculates a total of 5(State E) or 3(State F), respectively. Thus, the determination unit 104 determines, in either State E or State F, that the total has not reached the threshold.

If the determination unit 104 determines that the total has reached the threshold (YES in S4), the operation control unit 105 causes the display unit 473 to display a massage indicating that the safety to be secured by the image forming apparatus 1 is satisfied by the overall security level provided by the security standard or standards whose requirements are met by the image forming apparatus 1 (S5).

On the other hand, if the determination unit 104 determines that the total has not reached the threshold (NO in S4), the operation control unit 105 causes the display unit 473 to display a massage indicating that the safety to be secured by the image forming apparatus 1 is not satisfied by the overall security level provided by the security standard or standards whose requirements are met by the image forming apparatus 1 (S6).

In S5 and S6, the operation control unit 105 may cause the display unit 473 to display not only the above determination result but also the total calculated by the calculation unit 103 and the threshold.

In this first embodiment, the determination unit 104 can determines whether or not the total of the security levels of the security standard or standards whose requirements are met by the image forming apparatus 1 has reached the threshold, that is, whether or not the overall security level provided by the security standard or standards whose requirements are met by the image forming apparatus 1 has the safety which the operator requires for the image forming apparatus 1. Furthermore the operator can recognize those results from the screen display of the display unit 473

Therefore, the operator can know the overall security level applied to the image forming apparatus 1 and data handled thereby. The operator can also know based on the above notification, even if the security standards whose requirements are met by the image forming apparatus 1 are changed depending on the safety required for the image forming apparatus 1 and data handled thereby, whether or not the overall security level provided by the changed security standards satisfies a certain criterion. Thus, the operator can easily secure the security level satisfying the certain criterion from the changed security standards.

The technique disclosed in BACKGROUND does nothing more than notify the operator of a message indicating a change of the security level to remind the operator that the security level of the apparatus has been changed from the default. The image forming apparatus 1 and data handled by the image forming apparatus 1 require different levels of security depending on the safety required for the handled data and their security contents are changed as appropriate. In the above technique disclosed, however, the operator has difficulty knowing, even if the security contents are changed, the security levels of the changed security contents. In the first embodiment, by contrast, this problem can be solved as described above.

A description will next be given of a second embodiment of a security level management in the image forming apparatus 1. The second embodiment is described with reference to FIG. 3 and also to FIG. 5. FIG. 5 is a table showing exemplary totals calculated based on security features applied to the image forming apparatus 1. Any processing but not described in the second embodiment is the same as described in the first embodiment.

In the second embodiment, the security refers to a security feature and the calculation unit 103 calculates the total of the security levels of the security features applied to the image forming apparatus 1.

When the processing of the security level management starts, the security information acquisition unit 102 acquires security information elements (S1).

The calculation unit 103 reads from the security storage unit 101 the respective security levels of the security features indicated by the security information elements acquired by the security information acquisition unit 102 (S2) and calculates the total of the read security levels of the security features (S3).

The determination unit 104 determines whether or not the total calculated by the calculation unit 103 has reached a predetermined threshold (S4).

To illustrate the above, an example will be presented in which there are ten security levels from 1 to 10, the previously-mentioned security features are set at the following security levels: 6 for encryption, 5 for restriction on available time, 4 for overwrite/erase after use, 3 for fingerprint authentication, 2 for entry of alphanumeric password, and 1 for audit log, and the predetermined threshold is 15.

In this example, if, referring to FIG. 5, the image forming apparatus 1 is in State A in which encryption and restriction on available time are applied thereto, in State B in which encryption, restriction on available time, and overwrite/erase after use are applied thereto, in State C in which encryption, restriction on available time, overwrite/erase after use, and fingerprint authentication are applied thereto or in State D in which encryption, restriction on available time, overwrite/erase after use, fingerprint authentication, entry of alphanumeric password, and audit log are applied thereto, the calculation unit 103 calculates a total of 11(State A), 15(State B), 18(State C) or 21(State D), respectively. Thus, if the image forming apparatus 1 is in any of States B to D, the determination unit 104 determines, in each state, that the total has reached the threshold.

On the other hand, if the image forming apparatus 1 is in State A, the calculation unit 103 calculates a total of 11 for State A and, thus, the determination unit 104 determines, in State A, that the total has not reached the threshold.

Thereafter, the operation control unit 105 causes the display unit 473 to display contents appropriate to the determination result of the determination unit 104 (S5, S6). In S5 and S6, the operation control unit 105 may cause the display unit 473 to display not only the above determination result but also the total calculated by the calculation unit 103 and the threshold.

In the above calculation, the security features are given different security levels to have different weights. Alternatively, the security features may be given the same security level so that the calculation may be made for how many security features the image forming apparatus 1 has.

In this second embodiment, the operator can recognize from the screen display of the display unit 473 whether or not the total of the security levels of the security features applied to the image forming apparatus 1 has reached the threshold, that is, whether or not the overall security level provided by the security features applied to the image forming apparatus 1 has the safety which the operator requires for the image forming apparatus 1.

Figure 6:
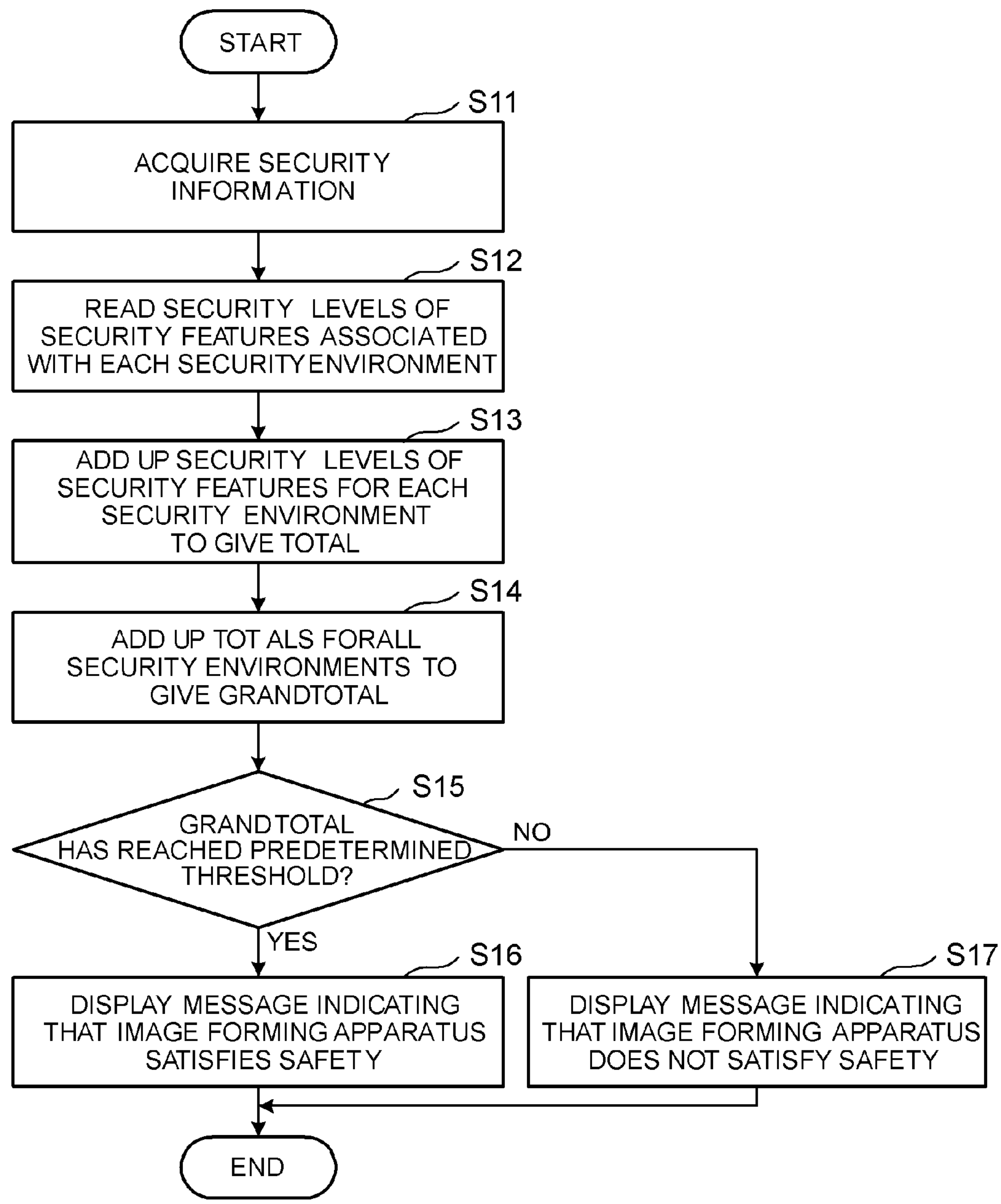
FIG. 6 is a flowchart showing a third embodiment of a security level management.

A description will next be given of a third embodiment of a security level management in the image forming apparatus 1. FIG. 6 is a flowchart showing the third embodiment of the security level management. FIG. 7 is a table showing exemplary totals calculated based on security environments applied to the image forming apparatus 1. Note that the description of the same processings as in the first and second embodiments is not given.

In this third embodiment, the security refers to a security environment. The security levels for each security environment are first added up using the respective security levels of the security features applied to the image forming apparatus 1 and subsequently the total of the security levels for all of the security environments is calculated. In other words, in the third embodiment, the total of security levels which the image forming apparatus 1 has for each of security environments illustrated below is added up and the grand total of the totals calculated for all the security environments is then calculated to detect the overall security level of the image forming apparatus 1.

To illustrate the above, an example will be presented in which the security environments applied to the image forming apparatus 1 are, as previously mentioned, (1) a defense against attacks from unauthorized users, (2) a defense against attacks from attackers outside the user environment, (3) a defense against attacks from attackers in the user environment, (4) a defense against abuse, and (5) indirect response to attacks (deterrence against data leakage). Examples of possible actors of abuse of authority in (4) are a service person, a manager, and a normal user.

Each of these security environments is associated with one or more predetermined security features. The association of each security environment with the security features is stored in the security storage unit 101.

For example, security environment (1), i.e., the defense against attacks from unauthorized users, is associated with encryption, restriction on available time, fingerprint authentication, and entry of alphanumeric password; security environment (2), i.e., the defense against attacks from attackers outside the user environment, is associated with encryption, restriction on available time, overwrite/erase after use, fingerprint authentication, and entry of alphanumeric password; security environment (3), i.e., the defense against attacks from attackers in the user environment, is associated with encryption, the restriction on available time, and entry of alphanumeric password; security environment (4), i.e., the defense against abuse, is associated with encryption, restriction on available time, entry of alphanumeric password, and fingerprint authentication; and security environment (5), i.e., indirect response to attacks, is associated with audit log having a deterrent effect on data leakage. Although other possible associated security features of (5) indirect response to attacks include self-test and external interface, this embodiment is described taking only audit log as an example.

The security features are, like the second embodiment, set at the following security levels: 6 for encryption, 5 for restriction on available time, 4 for overwrite/erase after use, 3 for fingerprint authentication, 2 for entry of alphanumeric password, and 1 for audit log.

The third embodiment is described with reference to FIG. 6. When the processing of the security level management starts, the security information acquisition unit 102 acquires security information elements (S11). The calculation unit 103 reads from the security storage unit 101 the respective security levels of the security features indicated by the security information elements (S 12).

At this time, the calculation unit 103 uses the respective security levels read for the security features to add up the security levels of the security features in each of the security environments indicated by the security information elements (S13) to give the total of security levels for each security environment.

Subsequently, the calculation unit 103 adds up the totals for all the security environments to give the grand total (S14). The determination unit 104 determines whether or not the grand total calculated by the calculation unit 103 has reached a predetermined threshold (S15).

For example, when the security features applied to the image forming apparatus 1 (security features indicated by the acquired security information elements) are all of encryption, restriction on available time, overwrite/erase after use, fingerprint authentication, entry of alphanumeric password, and audit log, only the security levels of security features common to security features applied to the image forming apparatus 1 are used for addition of the security levels of security features associated with each of the above security environments (1) to (5) and the calculation of the grand total.

Since here the security features applied to the image forming apparatus 1 are encryption, restriction on available time, overwrite/erase after use, fingerprint authentication, entry of alphanumeric password, and audit log and therefore the image forming apparatus 1 is in State A (FIG. 7), the calculation of the grand total is made as follows using the example described above.

As shown in FIG. 7, security environment (1), i.e., the defense against attacks from unauthorized users, is associated with, as effective measures, encryption, restriction on available time, fingerprint authentication, and entry of alphanumeric password. For the defense against attacks from unauthorized users, the calculation unit 103 adds up all of a security level of 6 for encryption, a security level of 5 for restriction on available time, a security level of 3 for fingerprint authentication, and a security level of 2 for entry of alphanumeric password to give a total of 16.

Security environment (2), i.e., the defense against attacks from attackers outside the user environment, is associated with, as effective measures, encryption, restriction on available time, overwrite/erase after use, fingerprint authentication, and entry of alphanumeric password. For the defense against attacks from attackers outside the user environment, the calculation unit 103 adds up all of a security level of 6 for encryption, a security level of 5 for restriction on available time, a security level of 4 for overwrite/erase, a security level of 3 for fingerprint authentication, and a security level of 2 for entry of alphanumeric password to give a total of 20.

Security environment (3), i.e., the defense against attacks from attackers in the user environment, is associated with, as effective measures, encryption, restriction on available time, and entry of alphanumeric password. For the defense against attacks from attackers in the user environment, the calculation unit 103 adds up all of a security level of 6 for encryption, a security level of 5 for the restriction on available time, and a security level of 2 for entry of alphanumeric password to give a total of 13.

Security environment (4), i.e., the defense against abuse, is associated with, as effective measures, encryption, restriction on available time, entry of alphanumeric password, and fingerprint authentication. For the defense against abuse, the calculation unit 103 adds up all of a security level of 6 for encryption, a security level of 5 for restriction on available time, a security level of 2 for entry of alphanumeric password, and a security level of 3 for fingerprint authentication to give a total of 16.

Security environment (5), i.e., indirect response to attacks, is associated with audit log as an effective measure. For indirect response to attacks, the calculation unit 103 adds up a security level of 1 for audit log to give a total of 1.

Subsequently, the calculation unit 103 adds up the respective totals for the security environments (1) to (5) to give a grand total of 66.

Now if the determination unit 104 has a threshold of 50 as the predetermined threshold, it determines that the grand total of 66 has reached the threshold of 50 (YES in S15). Thus, the operation control unit 105 causes the display unit 473 to display a massage indicating that the safety in security environment to be secured by the image forming apparatus 1 is satisfied by the overall security level provided by the security features applied to the image forming apparatus 1 (S16).

If an operator or a manufacturer or the like changes the contents of the security features applied to the image forming apparatus 1, the above addition and the above calculation of the grand total will be performed likewise for any one of States B to E determined by the contents of the changed security features (FIG. 7).

An example will now be described in which the security features applied to the image forming apparatus 1 are encryption and overwrite/erase after use and therefore the image forming apparatus 1 is in State B (FIG. 7). In this case, the calculation of the grand total is made as follows.

As shown in FIG. 7, for (1), i.e., the defense against attacks from unauthorized users, the calculation unit 103 adds up only a security level of 6 for encryption to give a total of 6.

For (2), i.e., the defense against attacks from attackers outside the user environment, the calculation unit 103 adds up a security level of 6 for encryption and a security level of 4 for overwrite/erase to give a total of 10.

For (3), i.e., the defense against attacks from attackers in the user environment, the calculation unit 103 adds up only a security level of 6 for encryption to give a total of 6.

For (4), i.e., the defense against abuse, the calculation unit 103 adds up only a security level of 6 for encryption to give a total of 6.

For (5), i.e., indirect response to attacks, the calculation unit 103 adds up no security level to give a total of 0.

Subsequently, the calculation unit 103 adds up the respective totals for the security environments (1) to (5) to give a grand total of 28.

Now if the determination unit 104 has a threshold of 50 as the predetermined threshold, it determines that the grand total of 28 has not reached the threshold of 50 (NO in S15). Thus, the operation control unit 105 causes the display unit 473 to display a massage indicating that the safety in security environment to be secured by the image forming apparatus 1 is not satisfied by the overall security level provided by the security features applied to the image forming apparatus 1 (S17).

In S16 and S17, the operation control unit 105 may cause the display unit 473 to display not only the above determination result but also the grand total obtained by the calculation unit 103 and the threshold.

In the above calculation, the above security features are given different security levels to have different weights. Alternatively, the above security features may be given the same security level so that the calculation may be made for how many security features the image forming apparatus 1 has as those associated with each security environment.

In this third embodiment, the operator can know whether or not the overall security level of the security environments applied to the image forming apparatus 1 and data handled thereby achieves a certain criterion in view of presence/absence of the security environments including a defense against attacks from unauthorized users, a defense against attacks from attackers outside the user environment, a defense against attacks from attackers in the user environment, a defense against abuse, and indirect response to attacks.

Figure 8:
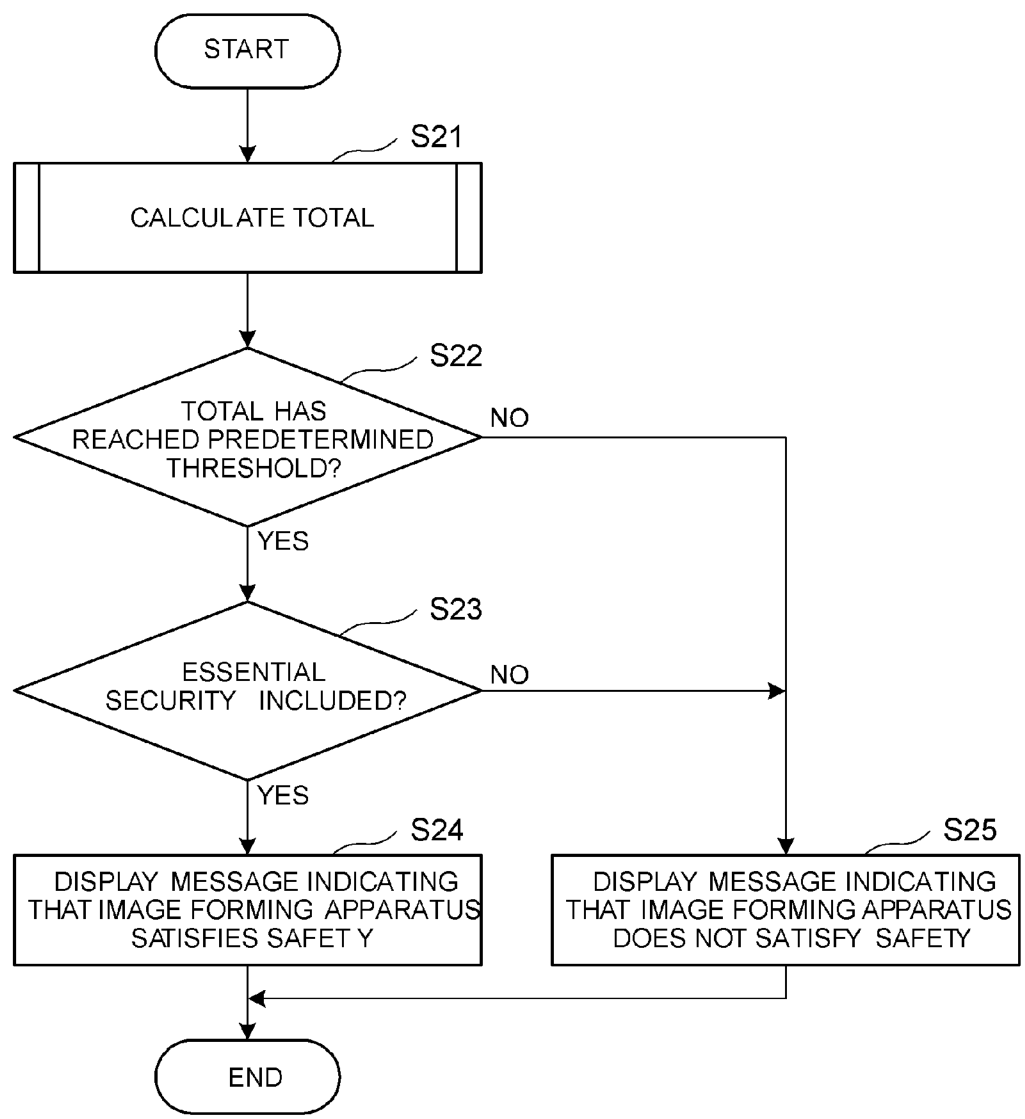
FIG. 8 is a flowchart showing a fourth embodiment of a security level management.

A description will next be given of a fourth embodiment of a security level management in the image forming apparatus 1. FIG. 8 is a flowchart showing the fourth embodiment of the security level management. Note that the description of the same processings as in the first to third embodiments is not given.

In this fourth embodiment, the total or grand total is calculated in the same manner as in any one of the first to third embodiments (S21). Then, if the determination unit 104 determines that the total or grand total has reached the threshold (YES in S22), it further determines whether or not the security or securities indicated by the acquired security information include a predetermined essential security or securities (S23). Also in this case, the security may be any of the security standard, the security feature and the security environment. However, if the security is the security standard, the predetermined essential security is also a security standard. If the security is the security feature or the security environment, the predetermined security is a security feature.

For example, if the security is the security standard, one or more security standards required to secure the safety of the image forming apparatus 1 are previously selected among International Security Standard, FIPS 140-2, and HIPAA and information indicating the essential security or securities is stored in the determination unit 104.

If the security is the security feature or the security environment, one or more security features required to secure the safety of the image forming apparatus 1 are previously selected among encryption, restriction on available time, overwrite/erase after use, fingerprint authentication, entry of alphanumeric password, and audit log and information indicating the essential security or securities is stored in the determination unit 104.

If the determination unit 104 determines that the security or securities indicated by the acquired security information include no predetermined essential security (NO in S23), the operation control unit 105 causes the display unit 473 to display a massage indicating that the safety to be secured by the image forming apparatus 1 is not satisfied by the overall security level provided by the security or securities applied to the image forming apparatus 1 (S25).

On the other hand, if the determination unit 104 determines that the security or securities indicated by the acquired security information include a predetermined essential security or securities (YES in S23), the operation control unit 105 causes the display unit 473 to display a massage indicating that the overall safety to be secured by the image forming apparatus 1 is satisfied by the overall security level provided by the security or securities applied to the image forming apparatus 1 (S24).

In other words, even if the determination unit 104 determines in S22 that the total or grand total has reached the threshold, the decision unit 106 decides that the overall security level secured by the image forming apparatus 1 has not reached the above reference level and thus the safety required for the image forming apparatus 1 has not been secured, unless the determination unit 104 determines in S23 that the essential security or securities are included. On the other hand, only if the determination unit 104 determines in S23 that the essential security or securities are included, the decision unit 106 decides that the overall security level secured by the image forming apparatus 1 has reached the above reference level and thus the safety required for the image forming apparatus 1 has been secured.

In this fourth embodiment, unless the image forming apparatus 1 is equipped with all the security or securities essentially required in a use environment or the like for the image forming apparatus 1, the safety in security of the image forming apparatus 1 is decided to be insufficient even if the total or grand total has reached the threshold. Therefore, whether or not the overall security level of the image forming apparatus 1 achieves a certain criterion is decided without focusing only on the security level determined based on the total or grand total and by further considering whether or not the specified security or securities required for the image forming apparatus 1 depending on a use environment and the like is applied. Hence, whether or not a true safety for the image forming apparatus 1 has been secured can be decided.

Figure 9:
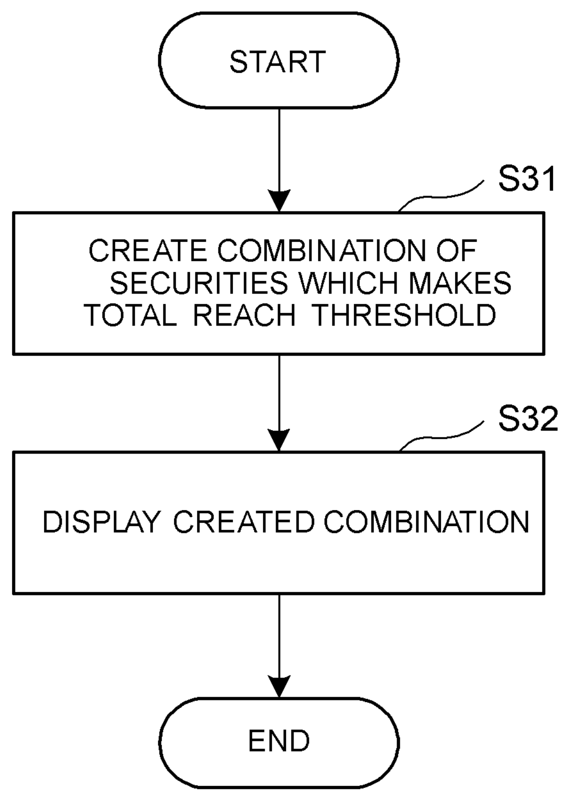
FIG. 9 is a flowchart showing a fifth embodiment of a security level management.

A description will next be given of a fifth embodiment of a security level management in the image forming apparatus 1. FIG. 9 is a flowchart showing the fifth embodiment of the security level management. Note that in FIG. 9 the illustration of the same processings as in the first to fourth embodiments is not given. Furthermore, the description of the same processings as in the first to fourth embodiments is not given in the fifth embodiment.

In this fifth embodiment, after the determination unit 104 determines in the first to third embodiments that the total or grand total has not reached the threshold (NO in S4, NO in S15) and the operation control unit 105 causes the display unit 473 to display a massage indicating that the safety to be secured by the image forming apparatus 1 is not satisfied by the overall security level provided by the security or securities applied to the image forming apparatus 1 (S6, S17), the creation unit 107 creates a combination of securities which makes the total or grand total reach the threshold using the securities stored in the security storage unit 101 (S31).

For example, in one of the examples shown in the first embodiment relating to the security standards, the image forming apparatus 1 is in State E that it satisfies only the requirement of FIPS 140-2, the calculation unit 103 calculates the total of 5 for State E, and the determination unit 104 determines that the total of 5 for State E has not reached the threshold of 8. In this case, the creation unit 107 creates a combination of security standards which makes the total reach the threshold of 8 or greater, for example, (a) a combination of International Security Standard, FIPS 140-2, and HIPAA which makes the total reach 18, (b) a combination of International Security Standard and FIPS 140-2 which makes the total reach 15, (c) International Security Standard which makes the total reach 10, or (d) a combination of FIPS 140-2 and HIPAA which makes the total reach 8.

In one of the examples shown in the second embodiment relating to the security features, the image forming apparatus 1 is in State A that encryption and restriction on available time are applied to it, the calculation unit 103 calculates the total of 11 for State A, and the determination unit 104 determines that the total of 11 for State A has not reached the threshold of 15. In this case, the creation unit 107 creates a combination of security features which makes the total reach the threshold of 15 or greater, for example, (i) a combination of encryption, restriction on available time, and overwrite/erase after use which makes the total reach 15, (ii) a combination of encryption, restriction on available time, overwrite/erase after use, and fingerprint authentication which makes the total reach 18, or (iii) a combination of encryption, restriction on available time, overwrite/erase after use, fingerprint authentication, entry of alphanumeric password, and audit log which makes the total reach 21.

After the creation unit 107 creates a combination of securities (S31), the operation control unit 105 causes the display unit 473 to display the securities indicated by the created combination (S32).

Thus, even if the overall security level provided by the security or securities applied to the image forming apparatus 1 or the overall security level provided after the security or securities applied to the image forming apparatus 1 have been changed does not achieve a certain criterion, the operator can know one or more combinations of securities which will achieve the overall security level satisfying the certain criterion. Therefore, the operator can easily maintain the overall security level of the image forming apparatus 1 at a certain level by reference to the securities indicated by the combinations.

Like the fourth embodiment, a true safety for the image forming apparatus 1 may be secured on condition that the securities applied to the image forming apparatus 1 include the essential security or securities. When in this case the creation unit 107 creates a combination of securities, it creates a combination of securities which include the essential security or securities and in which the total or grand total reaches the threshold (S31).

Thus, when changing the securities applied to the electronic apparatus, the operator can know a combination or combinations of securities which satisfy a certain criterion while securing the essential security or securities required for the image forming apparatus 1 depending on a use environment and the like.

Embodiments corresponding to aspects of the present disclosure are not limited to the configurations described above and can be modified in various ways. Although the description of the above embodiments is given taking as an example of the electronic apparatus the image forming apparatus which is a multifunction peripheral, the example is merely illustrative and the electronic apparatus may be an image forming apparatus other than multifunction peripherales, such as a copier, a scanner or a facsimile machine, or may be an electronic apparatus other than image forming apparatuses, such as a mobile terminal, a medical apparatus or an information processing apparatus.

Although in the above embodiments the display unit 473 is described as an example of the notification unit, the notification unit is not limited to the example and may be, for example, a buzzer or a voice notification device.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An electronic apparatus including:

a security storage unit configured to store a plurality of predetermined securities together with respective security levels associated with the securities;

a security information acquisition unit configured to acquire security information indicating the security or securities applied to the electronic apparatus;

a calculation unit configured to calculate a total of the security level or levels of the security or securities indicated by the security information acquired by the security information acquisition unit, using the security levels stored in the security storage unit; and a determination unit configured to determine whether or not the total calculated by the calculation unit has reached a predetermined threshold.

2. The electronic apparatus according to claim 1, further including:

a notification unit configured to notify an operator; and an operation control unit configured to cause the notification unit to notify of the determination result of the determination unit.

3. The electronic apparatus according to claim 2, wherein the determination unit further determines whether or not the security or securities indicated by the security information acquired by the security information acquisition unit include a predetermined essential security, and the electronic apparatus further includes a decision unit which decides that, only if the determination unit determines that the total has reached the predetermined threshold and determines that the security or securities indicated by the security information include the predetermined essential security, an overall security level secured by the electronic apparatus has reached a reference level.

4. The electronic apparatus according to claim 3, further including a creation unit which creates, if the determination unit determines that the total has not reached the threshold, a combination of the securities which makes the total reach the threshold, using some or all of the securities stored in the security storage unit, wherein the operation control unit causes the notification unit to notify of the securities indicated by the combination created by the creation unit.

5. The electronic apparatus according to claim 4, wherein the creation unit creates, if the determination unit determines that the security or securities indicated by the security information do not include the essential security, the combination of securities including the essential security.

6. The electronic apparatus according to claim 1, wherein the security storage unit stores normal security standards as the securities and also stores respective security levels associated with the security standards.

7. The electronic apparatus according to claim 1, wherein the security storage unit stores as the securities security features each capable of performing a predetermined processing and also stores respective security levels associated with the security features.

8. The electronic apparatus according to claim 7, wherein the calculation unit calculates a total of the security level or levels associated with the security feature or features, for each of one or more security environments including a predetermined at least one of the security features, and the determination unit determines, based on a grand total of respective totals calculated for the one or more security environments by the calculation unit, whether or not the grand total has reached the threshold.

9. An image forming apparatus including:

a security storage unit configured to store a plurality of predetermined securities together with respective security levels associated with the securities;

a security information acquisition unit configured to acquire security information indicating the security or securities applied to the image forming apparatus;

a calculation unit configured to calculate a total of the security level or levels of the security or securities indicated by the security information acquired by the security information acquisition unit, using the security levels stored in the security storage unit;

a determination unit configured to determine whether or not the total calculated by the calculation unit has reached a predetermined threshold;

a notification unit configured to notify an operator; and an operation control unit configured to cause the notification unit to notify of the determination result of the determination unit.

10. A security level management method including:

a security storage step of storing a plurality of predetermined securities together with respective security levels associated with the securities;

a security information acquisition step of acquiring security information indicating the security or securities applied to the electronic apparatus;

a calculation step of calculating a total of the security level or levels of the security or securities indicated by the security information acquired in the security information acquisition step, using the security levels stored in the security storage step; and a determination step of determining whether or not the total calculated in the calculation step has reached a predetermined threshold.

* * * * *